United States Patent [19]

Bendell

[11] Patent Number: 4,521,804
[45] Date of Patent: Jun. 4, 1985

[54] SOLID-STATE COLOR TV CAMERA IMAGE SIZE CONTROL

[75] Inventor: Sidney L. Bendell, Riverton, N.J.

[73] Assignee: RCA Corporation, Princeton, N.J.

[21] Appl. No.: 469,773

[22] Filed: Feb. 25, 1983

[51] Int. Cl.³ .......................... H04N 3/15; H04N 9/09
[52] U.S. Cl. ........................................ 358/51; 358/213
[58] Field of Search ........................... 358/50, 51, 213; 357/24, 30, 31

[56] References Cited

U.S. PATENT DOCUMENTS

| 3,872,499 | 3/1975 | McConnell et al. | 358/51 |
| 3,893,174 | 7/1975 | Sano et al. | 358/65 |
| 4,155,100 | 5/1979 | Hill | 358/183 |
| 4,158,208 | 6/1979 | Dischert | 358/10 |
| 4,215,368 | 7/1980 | Flory et al. | 358/139 |
| 4,285,004 | 8/1981 | Morrison et al. | 358/10 |
| 4,439,788 | 3/1984 | Frame | 358/213 |
| 4,442,457 | 4/1984 | Pines | 358/213 |

Primary Examiner—Michael A. Masinick
Attorney, Agent, or Firm—Eugene M. Whitacre; William H. Meise; Lawrence C. Edelman

[57] ABSTRACT

The apparent size of the image produced by a clocked solid-state television imager is controlled by the read clock rate. In a camera using such an imager the clock rate is adjusted to provide an effect similar to zoom. Where a plurality of imagers are used in a color camera, differential control of the clock rate as between the imagers allows compensation for lens chromatic aberration thereby providing for correction of misregistration. In the case where the optical system includes a variable focal length such as a zoom lens, the zoom control is coupled to the size clock control for compensating for the differences in optical power for different colors. The size adjustment may result in a second-order centering error. The centering error is reduced by a scheme for changing the time at which the read clock is gated to the imager in dependence upon the clock rate.

14 Claims, 11 Drawing Figures

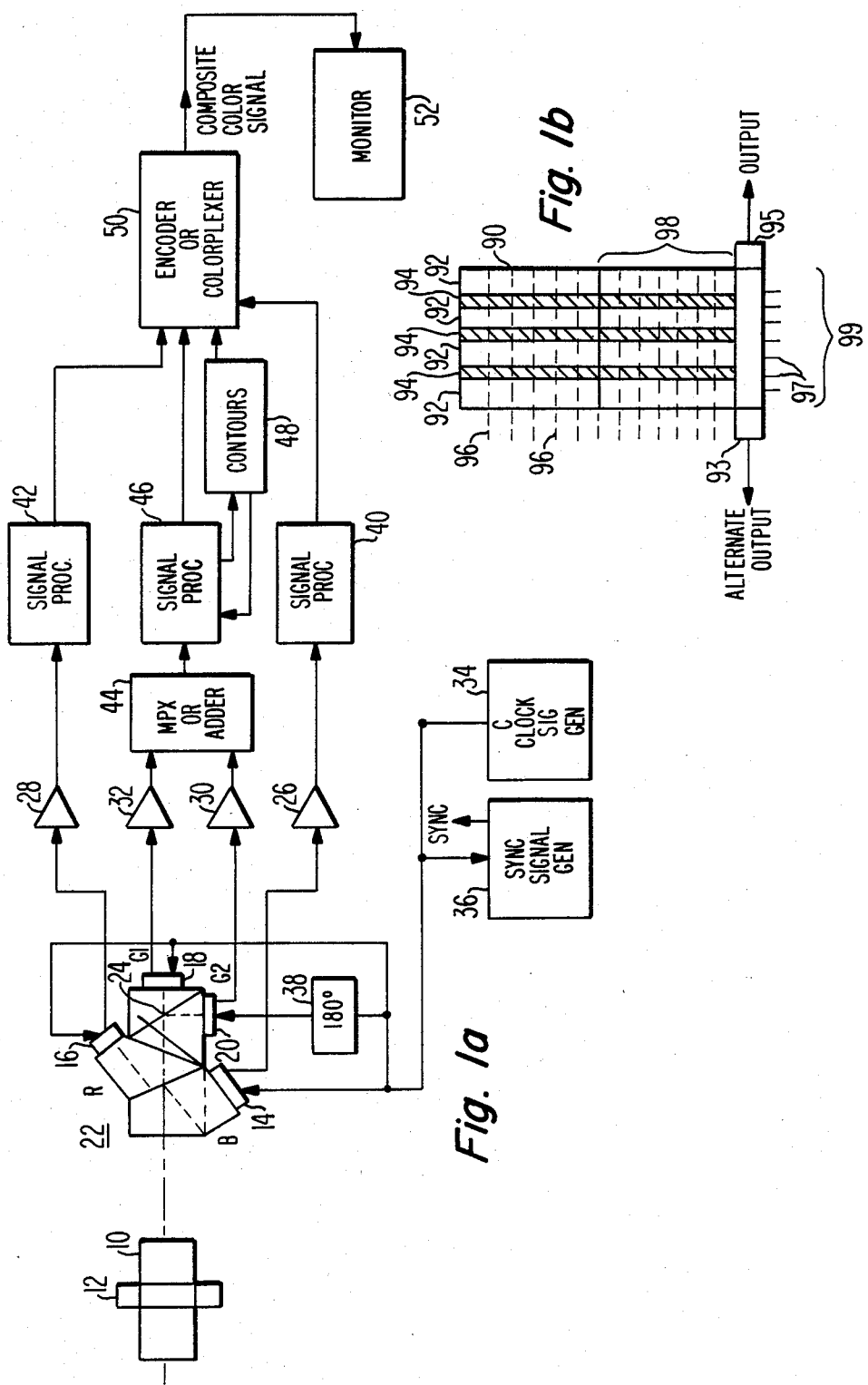

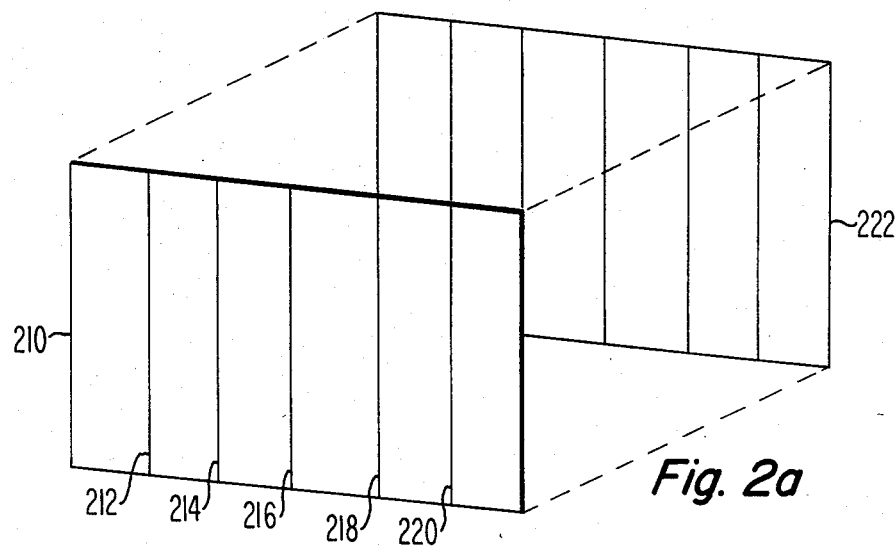
Fig. 2a
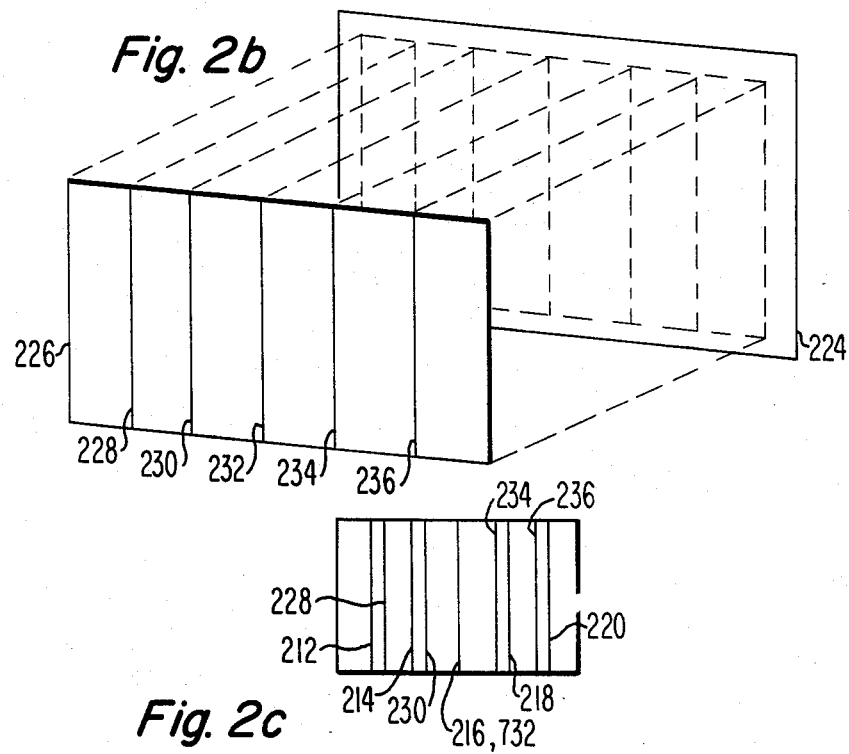
Fig. 2b
Fig. 2c

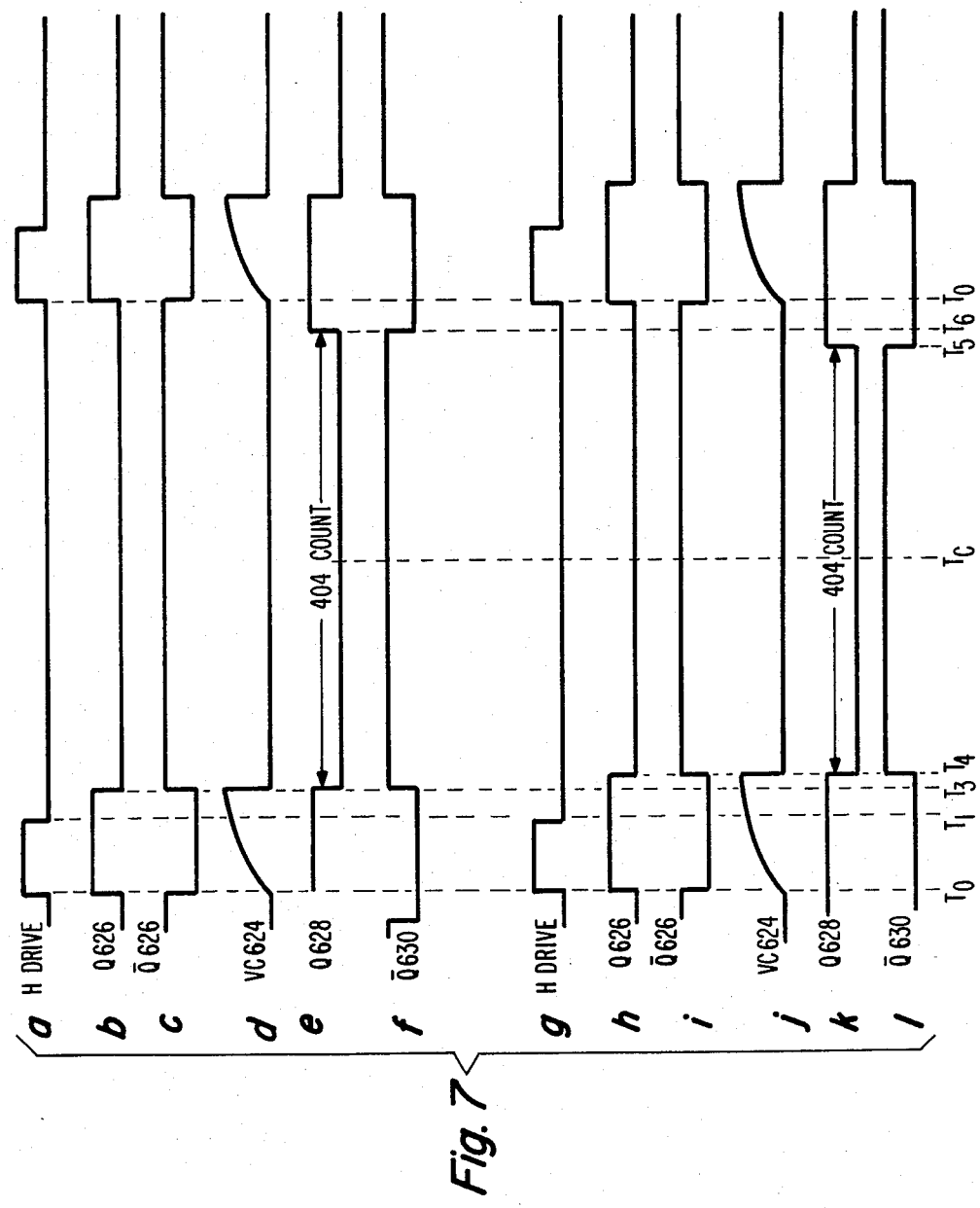

SOLID-STATE COLOR TV CAMERA IMAGE SIZE CONTROL

This invention relates to control of registration of a color television camera including more than one imager, particularly when a zoom lens is used.

Color television cameras have traditionally used several electron-beam camera tubes optically coupled to a color-splitting optical system to produce from each tube a signal representative of a color component of the light from a scene being imaged. The color-splitting optical system most often was a prism assembly with dichroic surfaces by which the light separation was accomplished. Because of the need for periodic replacement of the camera tubes, the optical coupling of the tubes to the prism is made by a complex mechanical assembly which can be disassembled for tube replacement. However, the camera tubes in order to produce color signals from which a correct image can be formed are required to scan the image simultaneously; i.e. the electron beam of each tube is required to scan that portion of its target upon which the portion of the image is focussed which is at that moment being scanned by the other tubes. Since the focussed image is generally less than 3 cm on a side and often less than 1 cm on a side, the slightest movement of the tube relative to the optical system can cause the scannings to become offset. Since each tube responds to a different color, this causes the image of one color to be offset with respect to the other colors upon subsequent reproduction of the scene. Such an offset is termed misregistration, and is avoided in electron-beam tube television cameras by a combination of mechanical integrity and stable electron-beam deflection or scanning. The requisite mechanical integrity makes it difficult to design a camera mount which allows the camera tube to be moved relative to the optics, so these are ordinarily fixed. The need for adjustment to cause the beam to scan over the proper portion of the image is met by controllable electron-beam deflection circuits. These circuits produce analog deflection signals such as sawtooth current waveforms. Because of their analog nature, the waveform may be adjusted in almost infinitesimally small amounts so as to obtain proper color registration.

The power of optical systems varies with the color of the light being processed. Wide-range zoom lenses are particularly susceptible to differential changes in power as the focal length is changed. The change in power causes the sizes of the different-color images focussed onto the targets of the camera tubes to differ slightly. This causes a misregistration of the camera, which is corrected by mechanically coupling a potentiometer or variable resistor to a movable portion of the optical system of the zoom lens to produce a control signal which varies in response to the focal length and therefore in response to the difference in image size. The control signal is coupled to the deflection circuits of the tubes for varying the deflection so that the scanning of each tube over its image occurs simultaneously with the scans of the other tube or tubes of the assemblage, so that misregistration errors are reduced or eliminated.

Camera tubes are bulky, heavy, fragile and consume substantial power during operation. Attention has therefore been directed to solid-state imager arrays, such as MOS or CCD imagers. These imagers include a plurality of individual light-responsive sites each of which generates signals representative of the total amount of light falling onto the site (also called an element or pixel). The discrete sensing sites cause resolution of the CCD imager to be limited by comparison with that of a modern camera tube, but the advantages of long life, light weight, ruggedness, signal-to-noise and low power consumption make the solid-state imager very attractive for color camera use.

The discrete sites of the solid-state imagers allow the scanning to be accomplished by addressing each site individually. In CCD imager arrays, a tripartite structure is used to accomplish the addressing. The first or "A" portion ("A" register) includes a rectangular array of sensor sites upon which light from the image is focussed. The array is formed of vertical columns separated from each other by stop channels, and within each column the discrete sensor sites are established by gate voltages. The gate voltages may be varied to move the signal generated at a site along the vertical column. The imager array also includes as a second part a "B" or buffer register generally corresponding in size with the "A" register, but isolated from light. Each column of the B register is coupled to an extension of a corresponding column of the A register. In operation, light is allowed to fall onto the A register for a predetermined period of time to form a signal at each site. A clock is then operated during a "pull-down" interval to move the signal of each sensor site vertically along the channel of a column to a corresponding site in the "B" register for temporary storage, thereby allowing the A register to again begin generating signal in response to light for a second or integrating interval, generally corresponding to the active portion of a television vertical interval, i.e. that portion of the vertical interval which is not vertical blanking inteval. During the active portion of the vertical interval, the signal stored in the B register is clocked into a parallel-to-serial "C" register and read out in serial form by a high-speed clock. The time-quantized analog-amplitude (sampled analog) signal derived from the C register is filtered to produce line-sequential analog tellevision signals which may be processed in a manner similar to those of a camera tube.

Because of the very long expected life of solid-state imagers, there is no need to mount them to the optical system in a temporary manner, and they may therefore be permanently bonded to the prism as described in U.S. Pat. No. 4,323,918 issued Apr. 6, 1982 in the name of S. L. Bendell. As there described, the registration is determined at the time the imagers are bonded into position. While this is effective, spacers may be necessary to position the various imagers at the proper focal point for the color in question, and the sizes of the images may not be the same at that focal point. Since the size of the imager is established by a photographic process which cannot easily be varied, all solid-state imagers of a given type are of about the same size. There being no convenient way to adjust the size of either the imager or of the image, there may be some residual misregistration. This problem is exacerbated when the optical system has a variable power as when a zoom lens having a variable focal length is varied. With this variation, the sizes of the color images vary with respect to each other. The largest size of the optical image is normally made to be greater than the physical size of the active portion of the imager onto which it is focussed, so that the size variation of the images does not cause edge portions of the image to disappear, but misregistration may occur or change by as much as several pixels. It is desirable to be able to adjust for misregistration in both a fixed and variable focal-length situation when solid-state imagers are used.

SUMMARY OF THE INVENTION

A color misregistration correction arrangement for a television camera includes an optical system having differential power causing images of different size for different colors. A first imager coupled to the optical system responds to a first color and includes an array of light-sensing pixels. A second imager is coupled to the optical system and responds to a different color. A clock is coupled to the imagers for sequentially reading signals from the first array within a reference time interval, and is controlled for reading signals from the corresponding array of the second imager in a time selected for reducing misregistration. In a particular embodiment, the time for reading the array of the second imager is varied in response to variations in the focal length of the optical system.

DESCRIPTION OF THE DRAWING

FIGS. 1a and 1b illustrate, partially in block-diagram form, a camera including a prism, an optical system with a four-port color-splitting prism and four discrete-sensor solid-state imagers;

FIGS. 2a, 2b, and 2c illustrate raster patterns aiding in understanding how changes in the power of the optical system can cause misregistration;

FIG. 7 is a timing diagram aiding in understanding the operation of the arrangements of FIGS. 5 and 6.

DESCRIPTION OF THE INVENTION

Figure 3:
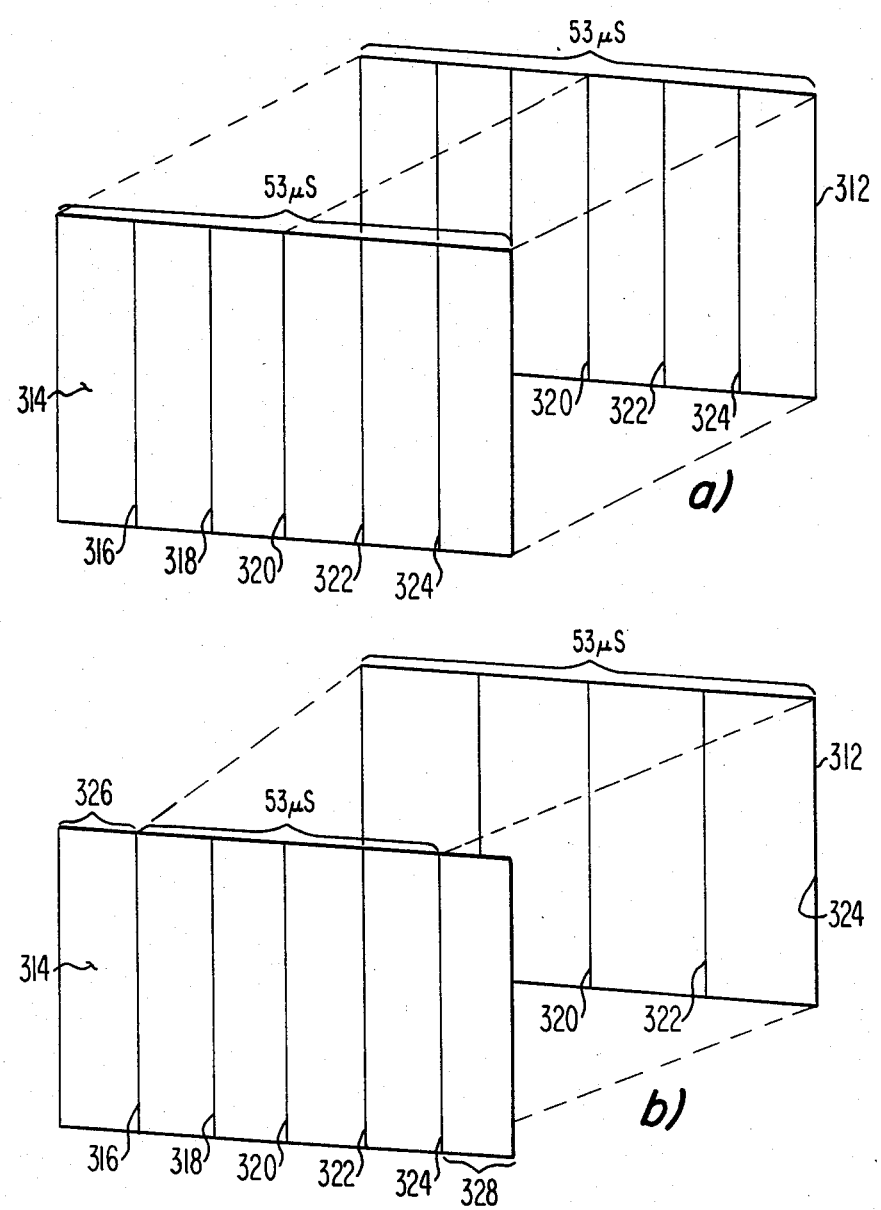
FIG. 3 illustrates rasters of a camera and a monitor with timing information aiding in understanding how changing the clock timing can change the apparent size of the image falling on an imager as seen or a monitor.

In FIG. 1, a television camera includes a zoom lens 10 with a manual control ring 12 which lens focusses a scene (not shown) onto the surfaces of a blue-responsive solid-state imager 14, a red-responsive imager 16 and two green-responsive imagers 18 and 20 by way of a prism 22 including dichroic surfaces and a 50% neutral reflecting surface 24 such as a half-silvered surface.

Each solid-state imager may be of the CCD type illustrated in FIG. 1b having an "A" register 90 onto which light is focussed and in the surfaces of which photoelectrons are generated. The photoelectrons are constrained within vertical channels by channel stops 94. Vertical motion of the accumulated image-representative charge is controlled by polyphase clock voltages applied to control electrodes illustrated as 96. After an integrating period, the clock signals are activated to produce a peristaltic motion of the electrons into corresponding portions of a "B" register 98 which is free from light influence. The charge in each packet is clocked in parallel from B register 98 to C-register 99, from which they are clocked in serial fashion by clock signals applied to clock electrodes 97. The signals are clocked to the right or to the left, depending on the phase relation of the polyphase C clock drive, to left or right output couplers or amplifiers 93 or 95, respectively.

The output signals from imagers 14, 16, 18 and 20 are clocked to preamplifiers 26, 28, 30 and 32, respectively, under control of clock signals applied from a clock signal generator 34. The signal from clock generator 34 applied to a sync signal generator 36 for generating the various sync signals, and is also applied to the imagers. The clock signals applied to the number-2 green imager 20 are phase-inverted with respect to those applied to number-one green imager 18 by a phase inverter 38 so that the green imagers are clocked alternately to produce an effective improvement in resolution when the imagers are respectively physically displaced by one-half pixel.

The blue and red signals amplified by preamps 26 and 28 are applied to signal processors 40 and 42, respectively, of standard types which may include clamps, shading and gamma corrections and other types of signal processing. The alternately-occurring green signals amplified by amplifiers 30 and 32 are applied to a multiplex circuit 44 which because of the alternate clocking of imagers 18 and 20 alternately receives the output signals from the green imagers. The multiplexed green signals are applied to a standard green signal processing circuit illustrated as a block 46. As is often the case, processor 46 is coupled to a green contour generator 48 for generating an edge signal which is added back to the green. The processed signals are applied to an encoder 50 in which the RGB signals are matrixed to YIQ, and the color-representative components are quadrature-modulated onto a subcarrier to form a composite signal such as NTSC or PAL.

The problem to which the invention is directed is that of color misregistration resulting from differences in the power of the optical portions of the camera, especially the lens, as a function of color. This is sometimes known as lateral chromatic aberration. The difference in lens power results in focus of the image at different distances from the lens, and in addition may result in the focussed images having different sizes. FIG. 2 aids in understanding the problem. In FIG. 2a, a focussed image 210 of a series of vertical stripes 212–220 such as a picket fence is illustrated for reference displaced from the surface 222 of the imager with which it is actually congruent. This may represent, for example, the red image focussed onto the red imager. FIG. 2b illustrates the effect of a difference in power of the optical system for some other color, such as blue, for which the power of the lens is greater. While the surface 224 of the blue imager is the same size as that of the red imager as illustrated in FIG. 2b, the focussed blue image 226 (again illustrated displaced from the imager for ease of understanding) is smaller than in the case of the red image. In actual use, the imager will be smaller than the smallest image focussed thereupon so that no "black areas" occur at the sides of any of the images. With the reduced-size image 226 focussed onto imager 224, it is easy to see that the stripes corresponding to 228–236 are physically closer together than the corresponding stripes 212–220 in FIG. 2a. If the stripes are white, so that both the illustrated imagers respond to the light, the stripe 232 will occur in the center of imager 224 and stripe 216 also occurs in the center of imager 222 (assuming that the imagers were initially set up properly). However, the stripes on the sides of the image are relatively displaced. The image produced on a color monitor from composite signals derived from the two imagers illustrated in FIG. 2 is illustrated in FIG. 2c. Since these stripes are of different colors, the center of the raster is registered (216 overlies 232) while the sides are misregistered. As mentioned, the misregistration changes with changes in the focal length or power of lens 10.

FIG. 3 illustrates the principle by which the invention operates. Generally, a monitor which responds to a camera scans horizontally across a raster 312 in a fixed interval, as for example 53.5 μS for NTSC (63.5 μS line interval minus 10 μS blanking), and the camera similarly scans its raster 314 in a like time, to reproduce vertical stripes 316-324 in proportional positions, as illustrated in FIG. 3a for reference. FIG. 3b illustrates the result when the camera scans more slowly but the monitor continues to scan at the original rate. As can be seen, the vertical stripes appear more widely separated on the monitor. The slow scanning of the raster results in loss of some image portions 326-328 at the right and left edges of the image reproduced on the monitor. Naturally, faster-than-normal scanning of the raster by the camera results in apparent compression of the distance between the stripes.

In accordance with the invention, the clocking rate of one or more of the imagers of a color television camera is relatively changed to effectively superpose the images formed from the signals. By this means, the effective relative positioning of the imagers can be adjusted after they are mechanically fixed, and/or misregistration attributable to color aberration may be compensated.

Figure 4:
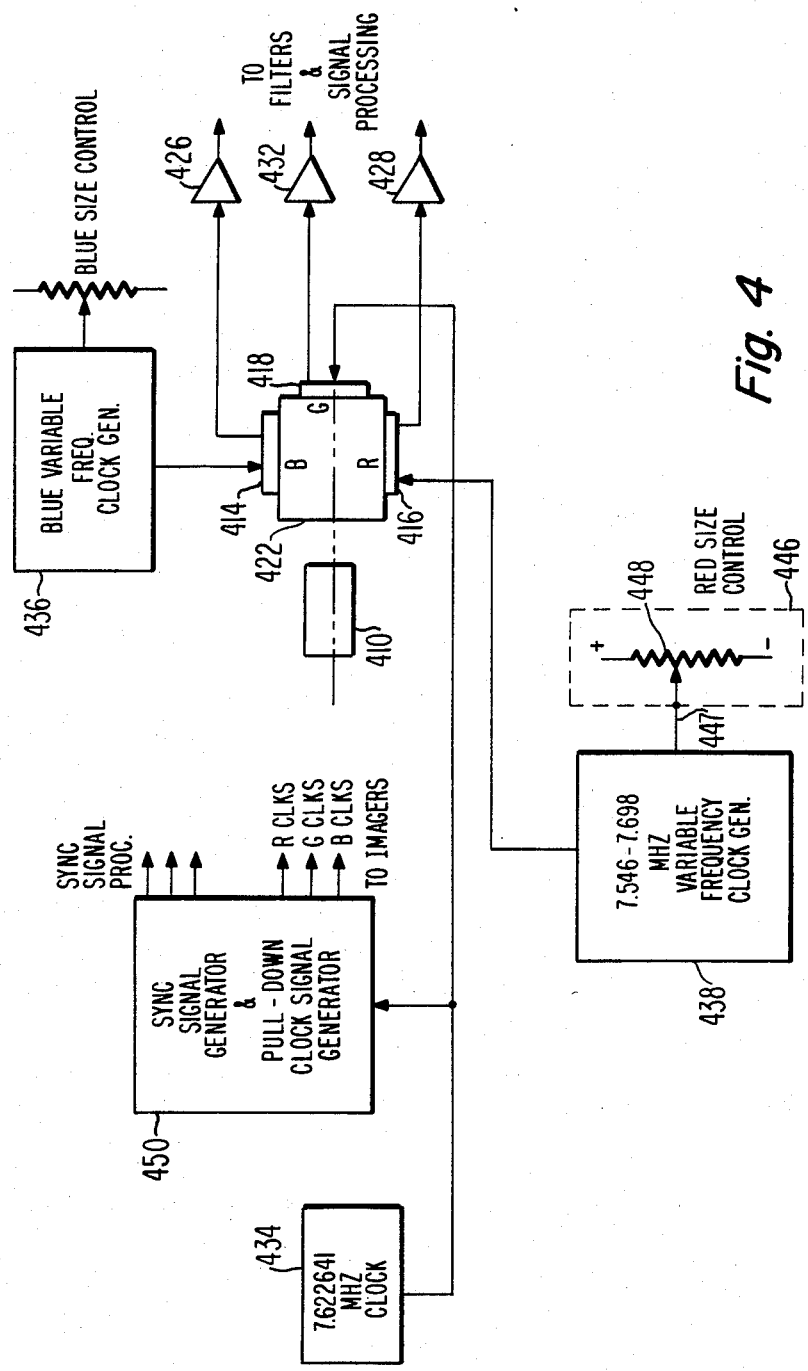
FIG. 4 illustrates, partially in simplified block-diagram form, a camera arrangement according to an aspect of the invention having a fixed optical system.

FIG. 4 illustrates in block-diagram form a color television camera in which the optical system is fixed and in which it is desired to compensate for misregistration attributable to relative physical misalignment of the imagers. In FIG. 4, a lens 410 focusses an image (not shown) onto B, R and G imagers 414, 416 and 418 by way of a prism 422. The signal produced by each imager is applied to a corresponding preamplifier 426, 428, 432 for amplification before being applied to further conventional signal processing (not shown). A clock signal generator 434 generates a reference clock signal which is applied to green imager 418. The standard clock frequency is established by assuming that each imager includes 404 active pixels to be scanned during a 53 μS active horizontal interval $$404/53(10^{-6}) = 7.622641 \text{ MHz} \tag{1}$$

the standard clock signal from generator 434 is also applied to sync signal generators and to pull-down clock signal generators illustrated together as a block 450 for control of the frequency thereof.

The blue and red imagers 414 and 416 receive C register clock signals from variable-frequency clock signal generators 436 and 438, respectively. Generator 436 is similar to generator 438. Generator 438 generates stable signals for driving the register of the imager by means of a crystal-controlled oscillator arranged with a variable voltage-controlled capacitor for variation over a relatively small frequency range near a selected operating point of the crystal, as is known. For example, the range of frequency variation of oscillator 438 may be selectable within 1% of 7.622641 MHz, based upon the assumption that the physical location of the imagers on the prism and differential power of the lens together result in an initial misregistration of not more than four pixels out of 404, or about 1%. Thus, it is necessary to produce a clock signal having a stable frequency between 7.546414 MHz and 7.698867 MHz, or ±76 KHz from the 7.622641 MHz reference frequency. Potentiometer 446 is arranged with its wiper to pick off the voltage required for the desired apparent size of the red image as viewed on a monitor. The equivalent BLUE SIZE control for clock generator 436 is used to adjust the apparent size of the blue image, so that both the red and blue images are superimposed on the green image and registration results.

Figure 5A:
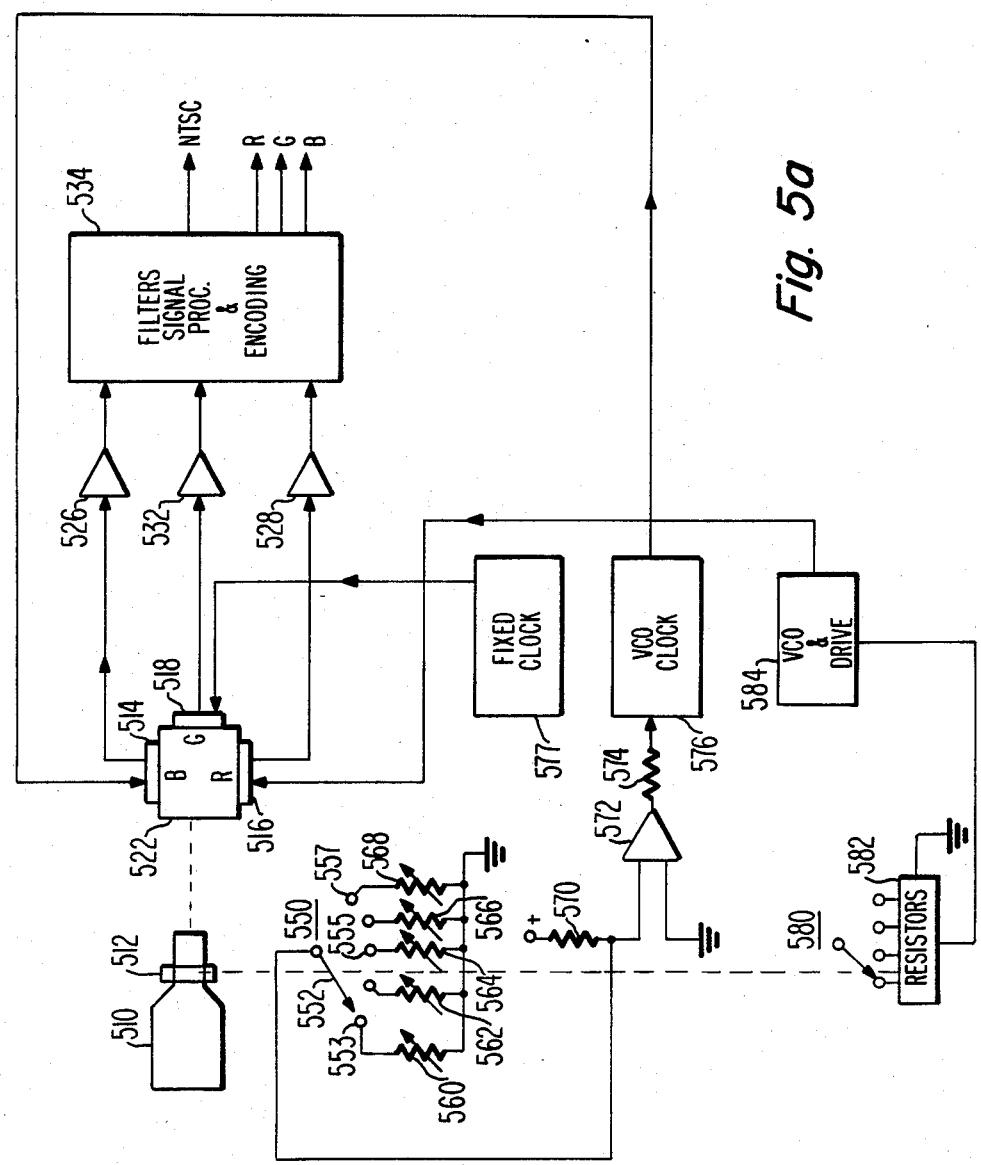
FIGS. 5a and 5b illustrate, partially in simplified block-diagram form, a camera arrangement with a variable optical system according to another aspect of the invention.

FIG. 5 illustrates partially in schematic and partially in block form a camera having a zoom lens coupled for control of registration. In FIG. 5a, a zoom lens 510 includes a control ring 512 for mechanically controlling the power of the optical portions of the lens. Lens 510 is optically coupled by a prism 522 to imagers 514-518, the signals from which are coupled by preamplifiers 526-532 to suitable filters, signal processing and encoding circuits illustrated together as block 534. Encoded composite NTSC signals are produced, as well as R, G and B baseband signals. A variable-frequency clock signal generator 576 is controlled by a direct voltage from a buffer amplifier 572, which receives as an input voltage the output of a variable voltage divider including a fixed resistor 570 and switch-selected variable resistors 560-568. A switch designated generally as 550 includes a wiper 552 mechanically coupled to zoom control 512 for coupling resistor 570 variously to grounded resistors 560-568 as the wiper sequentially encounters contacts 553-557 as control 512 is varied. Thus, stepwise-continuous voltages may be selected for control of the "C" register clock signal for control of the apparent size of blue imager 522 as zoom lens 510 is varied in power. The green imager receives a fixed clock signal and its image remains constant in apparent size. Switch 550 may be ganged with a further switch 580 coupled to a resistor bank 582 corresponding to resistors 560-568 for controlling a drive circuit and VCO illustrated together as a block 584. The clock signal produced by VCO 584 controls the "C" register of red imager 516. The arrangement of FIG. 5a may not be satisfactory for some critical uses, changes in the power of the zoom lens for the different colors may occur as a function of zoom angles. The arrangement of FIG. 5a changes the clock rate, but these changes have least effect at the left side of the raster and greatest effect at the right end, thus causing a second-order registration error resulting from centering error of the red and blue images.

Figure 5B:
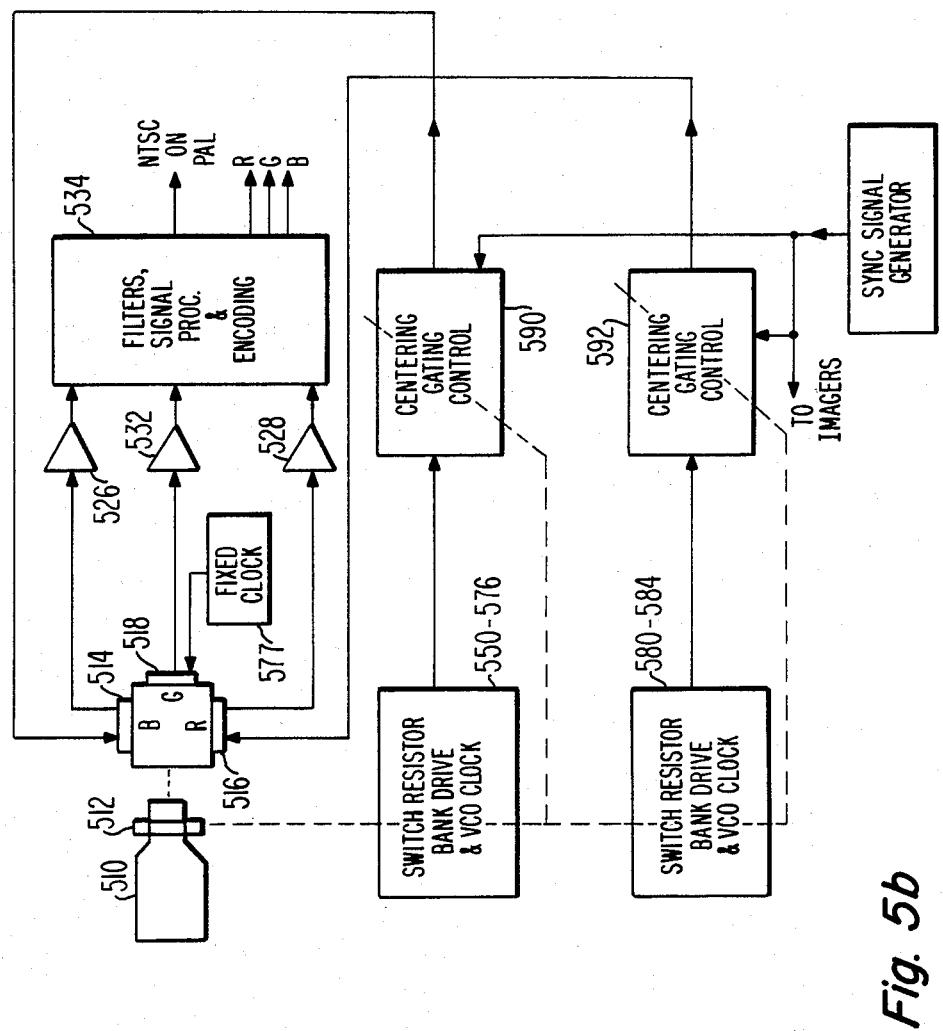
Figure 6:
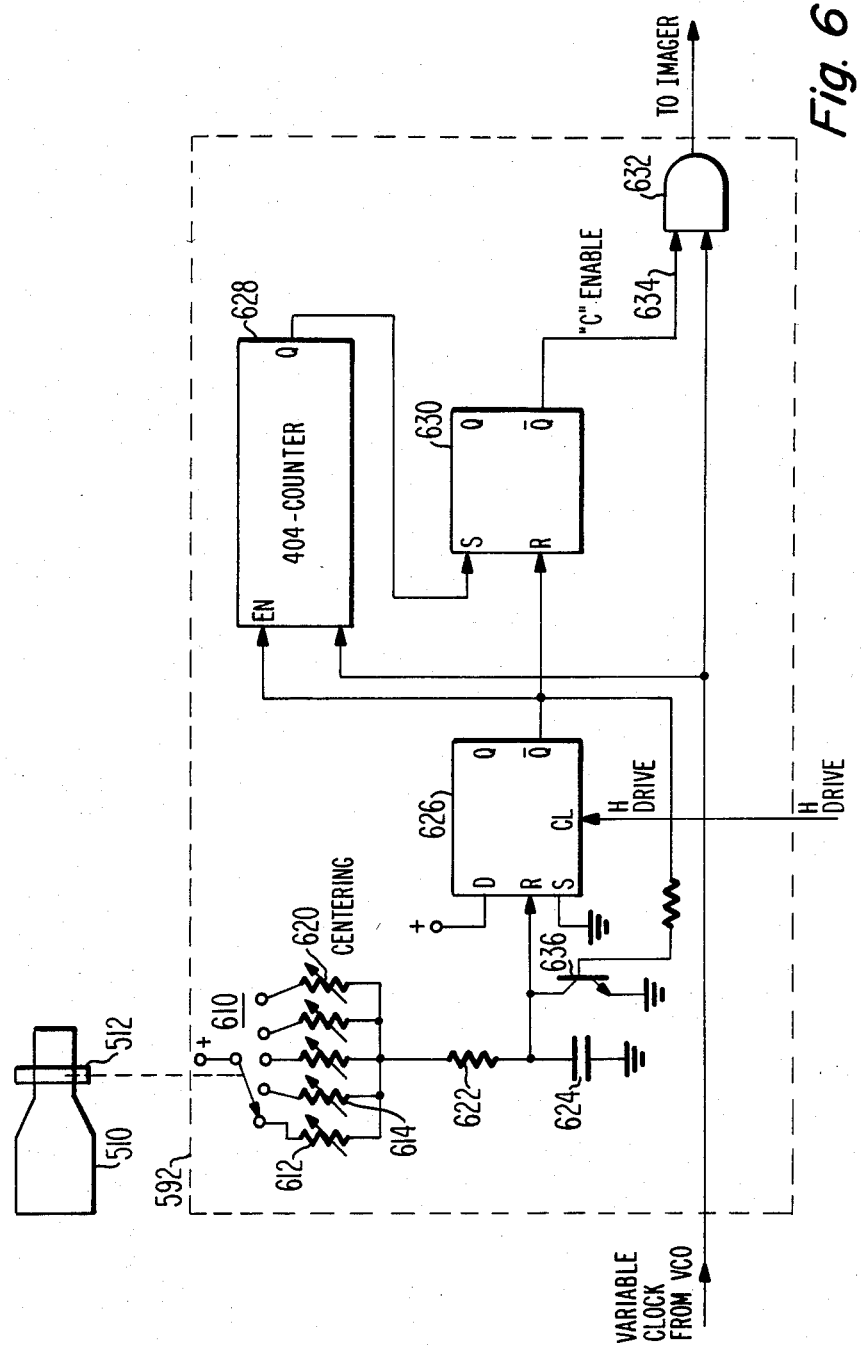
FIG. 6 illustrates details of the arrangement of FIG. 5.

FIG. 5b is a block diagram of the arrangement of FIG. 5a additionally including centering control blocks 590, 592 for centering adjustment of the red and blue rasters displayed on a monitor relative to the green raster for correction of residual centering error resulting from effective size adjustment. Centering gating controls 590 and 592 are mechanically coupled to zoom control 512, as suggested by the dashed line, for receiving an indication of the zoom position. FIG. 6 illustrates details of block 590, and block 592 is similar. In FIG. 6, the variable clock signal is gated through AND gate 632 by a "C enable" signal generated on conductor 634 by flip-flop (FF) 630. A D FF 626 periodically sets its $\overline{Q}$ output low at the beginning ($T_o$) of each horizontal (H) drive pulse, thereby disabling transistor 636 and allowing capacitor 624 to begin charging towards the reset (R) threshold voltage of FF 626 through a resistor 612-620 selected by a switch 610 mechanically coupled to control 512. At a time $T_3$ established by the time constant of resistors 612-622 and capacitor 624, FF 626 is reset, causing a positive-going transition at its $\overline{Q}$ output. The positive-going $\overline{Q}$ signal from FF 626 resets FF 630, and enables clock pulse counter 628, which counts 404 clock pulses (the number of pixels in a line of the imager) to again set FF 630. AND 632 is enabled during the count interval of counter 628.

FIG. 7 illustrates the timing sequence which allows apparent centering of the imager for correction of registration. FIGS. 7a-7f are for reference, and FIGS. 7g-7l illustrate the changes that occur when the zoom is varied, thereby varying the clock rate for registration correction and also varying the resistance in the charge path of capacitor 624. In FIG. 7, the horizontal drive pulse is illustrated as having a duration $T_0$-$T_1$. The $\overline{Q}$ output of FF626 goes low at time $T_0$, as illustrated in FIG. 7c, thereby disabling transistor 636 and allowing capacitor 624 to charge, as illustrated in FIG. 7d. Capacitor 624 reaches the threshold voltage at the R input of FF626 at time T3, causing its $\overline{Q}$ output to go high, enabling counter 628 and resetting FF 630. The high $\overline{Q}$ output of FF 630 illustrated in FIG. 7f enables gate 632 beginning at time T3, and gate 632 passes VCO clock pulses to its imager. Counter 628 counts 404 pulses and produces at time T6 a high $\overline{Q}$ output signal as illustrated in FIG. 7e for setting FF630, the $\overline{Q}$ output of which goes low to disable AND 632 and terminate clocking of the C register for the horizontal line in question.

By comparison, FIGS. 7g-7l illustrate the changes in gate timing which occur when the zoom control is operated to change the lens power in such a manner that the clock rate for one of the imagers must be increased. With the increase in clock rate established by a set of switched resistors as described in conjunction with FIG. 5, the resistor bank 612-620 is set up for a lower charging rate of capacitor 624. Consequently, the $\overline{Q}$ output of FF 626 goes low at time $T_0$ as before, but the lower changing rate of capacitor 624 causes the capacitor to reach the R threshold voltage of the FF at a time T4 which is later than time T3. Consequently, FF626 is reset later than was the case at the lower clock rate, and counter 626 begins counting at later time T4. However, the counting ends at a time T5 earlier than time T6, because of the higher clock rate. The counting interval of counter 628 establishes the gating interval during which clock pulses are applied to the imager for generating image signals. At the higher clock rate, counter 628 started later and ended earlier than when counting the lower-frequency clock pulses. Consequently, the time of the center of the counting interval relative to H drive remains the same, at time $T_C$. Thus, notwithstanding the change in clock rate, resistors 612-620 may be adjusted for each clock rate to provide an effective centering control.

Setup of the camera having both clock frequency and centering controls involves manipulation of each pair of controls (CENTERING and SIZE) for each of the red and blue images. If a zoom lens is used, the adjustments must be made at each position of the zoom lens for which a separate set of SIZE and CENTERING resistors is provided.

Other embodiments of the invention will be obvious to those skilled in the art. The entire SIZE and CENTERING control arrangement may be digital in nature rather than analog as shown, in which case the control information for the various positions of the zoom lens may be stored in various addresses of a ROM accessed by addresses generated by a rotation-to-address encoder mechanically coupled to the zoom control. The frequency modification of FIG. 4 may be implemented as a VCO controlled by a phase-lock loop to which a stable controllable low-frequency (0 to 140 KHz) oscillator is coupled for offsetting the frequency of the reference oscillator upward from 7.546 MHz. Alternatively, the frequency modification may be implemented as a high-frequency oscillator controlled in a PLL by use of a programmable frequency divider to produce at the divider output the desired frequencies near 7 MHz. The number of imagers used is a matter of choice, and the image size control may be applied only to one of many. Also, the size control may be used on all of the imagers of a TV camera, if desired, to control the effective magnification of the image, thereby providing an effect similar to that of a zoom lens but which remain in focus. The centering adjustment may be a separate adjustment not coupled to a zoom lens. Line scan arrays may be used instead of rectangular arrays, and the number of elements of the array is a mere matter of design choice. Generally similar techniques may be used for correction in the vertical direction.

What is claimed is:

1. An image size control arrangement for a color television camera, comprising:
   first and second solid-state imagers, each including an array of discrete light-responsive regions and a buffer register;
   optical means optically coupling a first color component of a scene to be imaged to said first imager and a second color component of said scene to be imaged to a second imager, said first and second color components being imaged to different sizes thereby causing color misregistration;
   pull-down clock generating means coupled to said solid-state imagers for establishing the recurrent light integrating intervals of said arrays and for transferring signals representative of said scene from each of said arrays to its corresponding buffer register;
   controllable clock signal generating means coupled to said buffer registers for applying respective clock signals to said respective buffer registers for controlling the rates of transfer of signals from said buffer registers, and further including rate control terminal means;
   registration control means coupled to said rate control terminal means for controlling the rate of said respective clock signals, thereby controlling said rates of transfer of signals from said buffer register relative to each other so as to apparently change the size of said imaged color components whereby said misregistration is reduced; and
   controllable application means coupled to said controllable clock signal generating means and responsive to a change in relative rates of said respective clock signals for controlling the relative times of application of said respective clock signals to said respective buffer registers in a manner so as to prevent movement of the apparent center of said imaged color components when their apparent size is changed.

2. A color misregistration correction arrangement for a television camera comprising:
   controllable optical means for forming images of a scene;
   a first solid state imager coupled to said controllable optical means and responsive to a first spectral light distribution of at least one of said images, said first imager including a first array of individual light-responsive regions each of which produces an electrical signal representative of the amount of light falling thereon;

a second solid-state imager coupled to said controllable optical means and responsive to a second spectral light distribution different from said first spectral light distribution, said second imager including a second array of individual light responsive regions corresponding with said first array;

clock signal generating means for generating clock signals which are coupled to said first and second imagers for sequentially reading each of said electrical signals at a rate such that said first array is read within a reference time interval and said second array is read within a second time interval related to said reference time interval, whereby if said reference and said second time intervals remain constant color misregistration results when said controllable optical means is controlled, as a result of differing responses of said controllable optical means to said first and second spectral distributions, which causes variation in the sizes of the images to which said first and second imagers respond as said controllable optical means is controlled; and clock control signal generating means coupled to be responsive to control of said controllable optical means and to said clock signal generating means for controlling said clock signals for controlling said second time interval relative to said reference time interval for compensating for said variations in the sizes of the images to which said first and second imagers respond for reducing said color misregistration when said controllable optical means is controlled.

3. An arrangement according to claim 1 wherein said controllable optical means comprises a zoom lens.

4. An arrangement according to claim 1 wherein said first and second imagers comprise a line array of light-responsive regions.

5. An arrangement according to claim 2 wherein said first and second imagers each comprise a plurality of line arrays of light-responsive regions.

6. An array according to claim 2 wherein each of said first and second imagers comprises a line array of light-responsive regions and a parallel-to-serial buffer array to which said clock signal generating means is coupled.

7. An arrangement according to claim 2 further comprising:

application control means coupled to said clock signal generating means for controlling the relative starting times of said reference time interval and of said second time interval for controlling the apparent centering.

8. An arrangement according to claim 7 further comprising centering control means coupled to said application control means and to said controllable optical means for controlling said relative starting times as said controllable optical means is controlled.

9. An arrangement according to claim 2 further including controllable coupling means coupled to receive said clock signals and responsive to control of said optical means for delaying or advancing the relative timing of the clock signals coupled to said first and second imagers, respectively, so as to prevent change of the apparent center of said images to which said imagers respond when said time intervals are controlled.

10. A television image centering control arrangement comprising:

a solid-state imager including an array of discrete light-responsive regions and a buffer register;

optical means for optically coupling a scene to said imager for illuminating said array, means for transferring signals representative of said scene from said array to said buffer register;

clock signal generating means for generating clock signals for controlling the rate of transfer of signals from said buffer register; and controllable gating means coupled to said clock signal generating means and to said imager for relatively advancing or retarding the time of gating of said clock signals to said imager controlling the apparent center of said imager.

11. An arrangement according to claim 10 further including:

rate control means coupled to said clock signal generating means for controlling the rate of said clock signals, said controllable gating means being responsive to control of the rate of said clock signals for advancing or retarding the time of gating said clock signals in a manner which prevents change of the apparent center of said optically coupled scene.

12. An image control arrangement for a television camera comprising:

a first solid state imager including an array of discrete light-sensitive regions onto which in use incident light from a scene is optically imaged and from which signals representative of said scene are read out under the control of clock signals;

a controllable clock signal source coupled to said first imager;

a second solid state imager also responsive to said scene which is optically imaged thereon but subject to misregistration with respect to the scene optically imaged on said first imager and from which signals representative of said scene are read out under the control of clock signals from a further clock signal source;

a changeable optical system for providing first and second images of said scene to said first and second imagers, respectively, the size and/or effective position of said images tending to change as said optical system is changed resulting in said misregistration; and a clock signal controller coupled to said controllable clock signal source and said changeable optical system and responsive to control signals indicative of change of said optical system so as to vary the timing of said clock signals coupled to said first imager in a manner influencing the size and/or effective position of the image represented by the signals read out from said first imager so as to compensate said changes in image size and/or position and reduce said misregistration.

13. An arrangement according to claim 12 wherein said control signals are indicative of a power change of said optical system.

14. An arrangement according to claim 12, further including controllable coupling means coupled to said clock signal controller and responsive to variation of said timing of said clock signals which changes the size of the image representeed by the signals read out from said first imager, for advancing or retarding the time of coupling said clock signals to said first imager relative to said second imager by an amount which prevents movement of the apparent center of said image representative signals read out from said first image.

* * * * *